R. H. UHLINGER.
PROCESS FOR PRODUCING HYDROGEN.
APPLICATION FILED APR. 20, 1920.
1,363,488.
Patented Dec. 28, 1920.
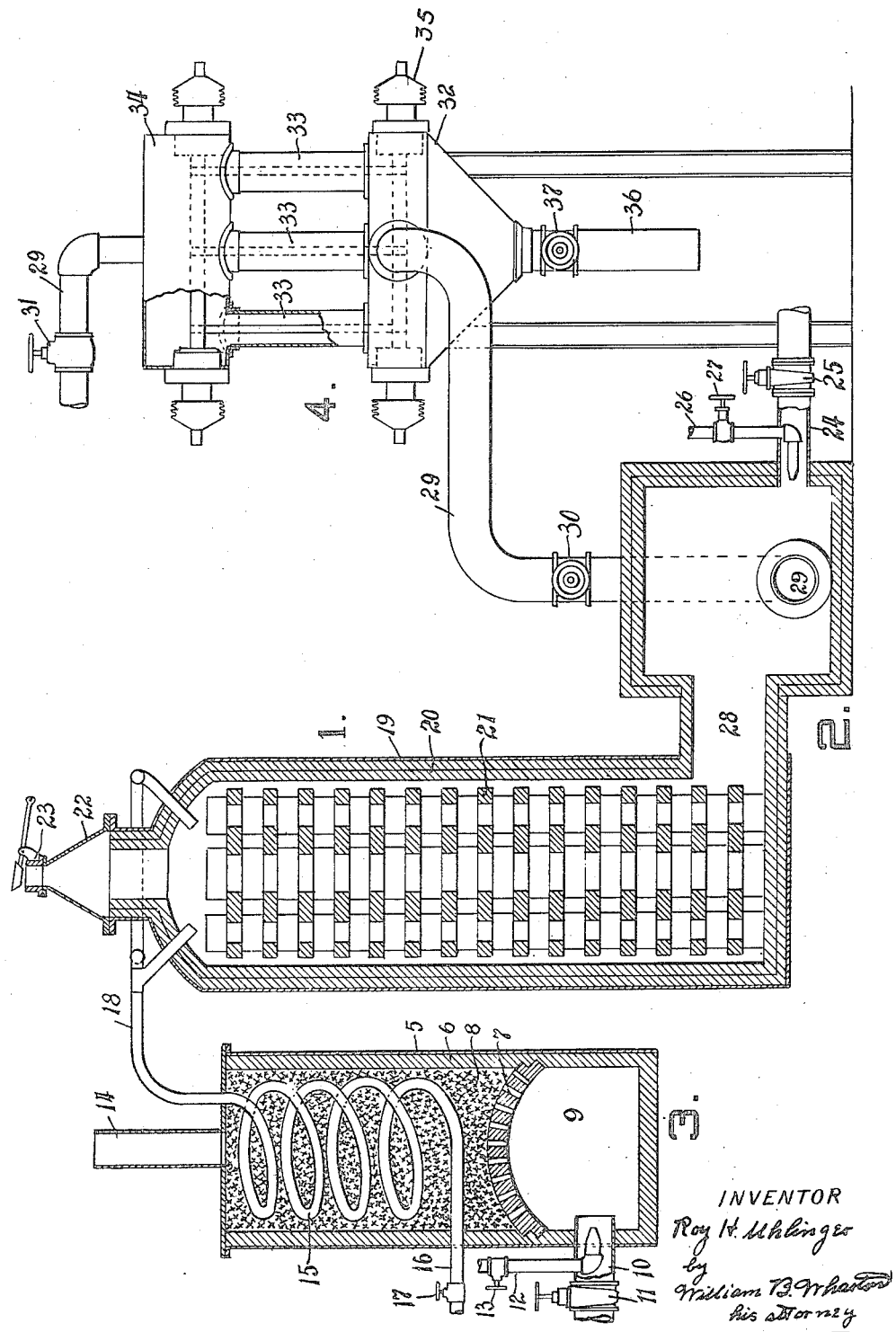
INVENTOR
Roy H. Uhlinger
by
William B. Wharton
his attorney

UNITED STATES PATENT OFFICE.

ROY H. UHLINGER, OF PITTSBURGH, PENNSYLVANIA.

PROCESS FOR PRODUCING HYDROGEN.

1,363,488. Specification of Letters Patent. Patented Dec. 28, 1920.

Application filed April 20, 1920. Serial No. 375,196.

*To all whom it may concern:*

Be it known that I, ROY H. UHLINGER, a citizen of the United States, and resident of Pittsburgh, in the county of Allegheny and State of Pennsylvania, have invented a new and useful Improvement in Processes for Producing Hydrogen, of which the following is a specification.

This invention relates to a process for the production of hydrogen and carbon black by the decomposition of methane, natural gas, or other hydrocarbon gases or oils.

In the decomposition of hydrocarbon gases or oils to form comparatively pure hydrogen, high temperatures, approximately 1100° centigrade to 1300° centigrade are required, it being in general necessary to maintain the decomposing chamber at a temperature approximating the upper of these limits. It will be readily understood that the quantity of fuel and time required to raise the temperature of the decomposing chamber through the last few hundred degrees is disproportionally higher than that required to raise the temperature to a lower point, for instance to 900° or 1000° Fahrenheit. Even though the decomposing chamber be made of as great a length as possible; it is necessary to reheat it frequently to maintain it at the requisite high temperature if the gas or oil to be decomposed be relatively cold when introduced into the chamber.

The object of the invention is, therefore, to so preheat the hydrocarbon gas or oil before its introduction into the decomposing chamber that it will abstract less heat from any portion of the chamber, thus permitting the process to be continued for a much longer time without reheating of the chamber.

The accompanying drawings illustrate in vertical section apparatus designed for use in conducting a process according to the present invention.

The primary elements of such apparatus comprise a decomposing furnace 1, a mixing and combustion chamber 2 therefor; a preheater 3; and an electric precipitator 4.

The preheating furnace 3 comprises preferably a metallic shell 5 which is lined with refractory material 6. An arch 7 supports refractory material 8 with which the body of the furnace is filled, and leaves thereneath a combustion space or chamber 9. To the combustion chamber 9 leads the air inlet conduit 10, provided with valve 11, and the gas inlet pipe 12, provided with the valve 13. At the upper extremity of the furnace is provided a stack 14 for leading off the products of combustion. Passing through the refractory material 8 in the furnace is a pipe coil 15 having connected therewith the gas or oil pipe 16, provided with valve 17, and the outlet pipe 18 leading to the decomposing furnace 1 adjacent the upper extremity of the furnace.

The decomposing furnace 1 comprises an outer gas tight shell 19 and an inner refractory lining 20. Extending throughout the greater proportion of the height of the furnace is the checkerwork 21 of refractory brick which forms the decomposing chamber. At the upper extremity of the furnace is a stack 22, having therein a hot blast valve 23, and in communication with the lower extremity of the furnace is the mixing chamber 2. An air inlet conduit 24 provided with a valve 25, and a gas pipe 26 provided with a valve 27, lead to the mixing chamber.

In heating the preheater 3, primary combustion takes place in the combustion chamber 9, and combustion is completed in the refractory material 8. Similarly, in the case of decomposing furnace 1, a large proportion of the fuel and air burns in the mixing chamber 2 and in the passage 28 leading to the decomposing chamber, while the final stages of combustion take place in the checkerwork 21.

A hydrogen outlet conduit 29, provided with a valve 30, leads from the mixing chamber 2. In the hydrogen gas outlet 29 is the electric precipitator 4, the conduit 29 being provided beyond the precipitator with a valve 31. The precipitator comprises, as is usual, a hopper 32, upright tubes 33, a manifold 34, and suitable connecting plugs 35 for the electric circuit. A conduit 36, having therein valve 37, serves as a discharge outlet for solid material deposited in the hopper 32.

In order to prepare the decomposing chamber for a treatment, air and gas valves 25 and 27, together with hot blast valve 23, are opened, and valve 30 in gas outlet conduit 29 is closed. Combustion thus takes place in mixing chamber 2, and upwardly through checkerwork 21, until the temperature of the checkerwork has been raised to a temperature of from 1100° centigrade to 1300° centigrade.

During the heating of the decomposing chamber, air and gas valves 11 and 13 leading to the preheating chamber are opened, and the combustible mixture burned in the combustion chamber 9 and refractory material 8 of the preheater. This heating is continued until the refractory material is raised to a temperature of from 500° to 900° centigrade. In no event should the temperature of the preheater exceed 900° centigrade, as above this point the gas or oil being treated will begin to decompose with the formation of carbon, which would tend to clog the pipe coil 15 of the preheater. It will be understood that the temperature of the preheater will, however, be varied for different substances to be treated within the range of temperatures given. Thus for a hydrocarbon oil the temperature will be made to approximate the lower limit, while with natural gas or substantially pure methane, it may approach the higher limit, as the lighter hydrocarbons decompose less readily.

When the checkerwork of decomposing chamber 1 has been raised to the requisite temperature of from 1100° C. to 1300° C., the hot blast valve 23, and the valves 25 and 27 of air and gas inlet pipes 24 and 26 to decomposing furnace 1 are closed, and valve 30 in outlet conduit 29 is opened.

Valve 17 in gas or oil supply line 16 to the preheater is then opened, and the gas or oil allowed to pass through pipe coil 15, and by way of outlet line 18, to the upper extremity of the preheating furnace. The gas passes downwardly through the checkerwork 21, being decomposed into hydrogen and carbon black during its passage, and escapes by way of outlet conduit 29 from the mixing chamber 2.

If the hydrocarbon initially treated be an oil, it will be in a vaporized condition when delivered to the decomposing furnace and brought into contact with the highly treated refractory material of the checkerwork 21.

The carbon black formed by this decomposition is carried by the stream of hydrogen through outlet conduit 29 to the electric precipitator 4. The open checkerwork 21 of the decomposing furnace does not tend to collect and retain any material amount of the carbon black, so that substantially all of it is carried to the precipitator; thus maintaining the decomposing furnace in a clean condition, and facilitating recovery of the carbon black.

Some of the carbon black entering the precipitator 4 is deposited initially in hopper 32, while the remainder is precipitated by the electric discharge in the tubes 33 and also collects in the hopper. The hydrogen as it leaves the precipitator through pipe 29, is thus cleansed of all carbon and contains only traces of such impurities as carbon monoxid, hydrogen sulfid, and methane, which may be removed subsequently by any of the well known processes for this purpose.

When the temperature within the decomposing furnace falls below that at which a satisfactory decomposition of the hydrocarbon takes place, that is to approximately eleven hundred degrees centigrade, the decomposing treatment is discontinued and the decomposing furnace is reheated. For this purpose, the supply of hydrocarbons to the decomposing furnace is cut off, and the valve 30 in hydrogen outlet conduit 29 closed. The gas and air connections then arranged as previously described, to cause combustion in the mixing chamber and checkerwork of the furnace.

It is obvious that during the heating of the furnace, heat may be supplied to the preheater by means of any suitable conduit connecting the preheater with the stack 22 of the decomposing furnace.

The employment of the preheater is of great advantage in that it lessens the rate at which heat is abstracted from the decomposing furnace and the consequent lowering in the temperature of the furnace. This increases the duration and output of a decomposing treatment, and also leaves the furnace at a relatively high temperature upon the completion of such treatment.

It will be understood that heat may be supplied to the preheater, and to the stream of hydrocarbon passing therethrough, continuously during the actual process of decomposition in the decomposing furnace itself. It is, of course, impossible to supply heat directly to the decomposing furnace during decomposition of the hydrocarbon therein; but a proportion of the heat requisite for decomposition may thus be added continuously to the stream of the hydrocarbon to be decomposed at a point external to the decomposing furnace. Any clogging effect is avoided by maintaining the preheater throughout the process at a temperature slightly lower than that which would cause decomposition of the particular hydrocarbon undergoing treatment.

Economy is also effected by lessening the drop in temperature within the decomposing furnace. This is the case because a disproportionately high number of heat units, necessitating a disproportionate expenditure of time and fuel, are required to raise the refactory material of the furnace through the last few hundred degrees before reaching the desired operating temperature.

What I claim is:

1. The process of producing hydrogen which consists in raising a hydrocarbon to a temperature of from 500° centigrade to 900° centigrade, and introducing such heated hydrocarbon into a decomposing chamber maintained at a temperature of from 1100° C. to 1300° C.

2. The process of producing hydrogen which consists in raising the temperature of a decomposing furnace to from 1100° C. to 1300° C., introducing a stream of a fluid hydrocarbon into said decomposing furnace and preheating the stream of hydrocarbon in its passage to the decomposing furnace to a temperature of from 500° C., to 900° C.

3. The process of producing hydrogen which consists in raising the temperature of a decomposing furnace to from 1100° C., to 1300° C., introducing a stream of a fluid hydrocarbon into said decomposing furnace, and preheating the stream of hydrocarbon in its passage to the decomposing furnace to a temperature slightly lower than that at which decomposition of the particular hydrocarbon undergoing treatment takes place.

4. The process of producing hydrogen which consists in raising the temperature of a hydrocarbon to a point slightly below that at which decomposition of such hydrocarbon takes place, and decomposing such hydrocarbon by bringing it into contact with highly heated refractory material within an inclosing chamber.

5. The process of producing hydrogen which consists in raising the temperature of a hydrocarbon to a point slightly below that at which decomposition of such hydrocarbon takes place, and decomposing such hydrocarbon by bringing it into contact within an inclosing chamber with refractory material at a temperature of from 1100° C., to 1300° C.

6. The process of producing hydrogen which consists in preheating a hydrocarbon gas to a temperature no higher than 900° C., and decomposing such hydrocarbon by bringing it into contact within an inclosing chamber with refractory material at a temperature of from 1100° C., to 1300° C.

7. The process of producing hydrogen which consists in preheating a hydrocarbon oil to a temperature no higher than 700° C., and decomposing such hydrocarbon oil by bringing it into contact within an inclosing chamber with refractory material at a temperature of from 1100° C., to 1300° C.

8. The process of producing hydrogen which consists in preheating a hydrocarbon to a temperature lower than that at which decomposition of such hydrocarbon takes place, and subjecting such preheated hydrocarbon to a high temperature sufficient to decompose it into hydrogen and carbon.

9. The process of producing hydrogen which consists in preheating a hydrocarbon gas to a temperature no higher than 900° C., and subjecting such preheated hydrocarbon gas to a high temperature sufficient to decompose it into hydrogen and carbon.

10. The process of producing hydrogen which consists in preheating a hydrocarbon oil to a temperature no higher than 700° C., and subjecting such preheated hydrocarbon oil to a high temperature sufficient to decompose it into hydrogen and carbon.

In witness whereof, I hereunto set my hand.

ROY H. UHLINGER.

Witnesses:
FLORENCE F. SCHWARTZ,
GRETTA W. ALSTON.